(12) United States Patent
Zurcher et al.

(10) Patent No.: US 7,673,559 B2
(45) Date of Patent: Mar. 9, 2010

(54) DEVICE AND METHOD FOR SELECTING AND BREWING THE CONTENTS OF A CAPSULE TO PREPARE A BEVERAGE

(75) Inventors: Alain Zurcher, Pampigny (CH); Pierre Pillot, Forel-sur-Lucens (CH)

(73) Assignee: Nestec S.A., Vevey (CH)

( * ) Notice: Subject to any disclaimer, the term of this patent is extended or adjusted under 35 U.S.C. 154(b) by 1706 days.

(21) Appl. No.: 10/840,883

(22) Filed: May 7, 2004

(65) Prior Publication Data

US 2004/0237793 A1 Dec. 2, 2004

Related U.S. Application Data

(63) Continuation of application No. PCT/EP02/12174, filed on Oct. 30, 2002.

(30) Foreign Application Priority Data

Nov. 9, 2001 (EP) .................................. 01126726

(51) Int. Cl.
*A47J 31/00* (2006.01)
(52) U.S. Cl. ...................... 99/295; 99/289 R; 99/302 R
(58) Field of Classification Search ............ 99/279–323, 99/275–277, 495, 485–489, 516, 536; 426/231–233, 426/433, 115; 221/124, 131, 81
See application file for complete search history.

(56) References Cited

U.S. PATENT DOCUMENTS

| 3,521,790 | A | * | 7/1970 | Freise et al. | ................... | 221/81 |
| 3,812,273 | A | * | 5/1974 | Schmidt | ..................... | 426/433 |
| 4,363,451 | A | * | 12/1982 | Edney et al. | .................. | 241/39 |
| 4,724,752 | A | * | 2/1988 | Aliesch et al. | ............ | 99/289 R |
| 5,134,924 | A | * | 8/1992 | Vicker | ......................... | 99/280 |

FOREIGN PATENT DOCUMENTS

| EP | 1 002 490 A1 | 5/2000 |
| EP | 1 089 240 A2 | 4/2001 |
| WO | WO 02/078499 A1 | 10/2002 |

* cited by examiner

*Primary Examiner*—Timothy F. Simone
(74) *Attorney, Agent, or Firm*—K&L Gates LLP

(57) ABSTRACT

A device for preparing drinks that incorporate a capsule selection function connected to a system for brewing the contents of the capsules to enable brewing to take place under optimal conditions. The device includes a storage system comprising capsules arranged in several sets, a mechanism for capturing a capsule individually from a set and releasing the capsule into a brewing system. The capture mechanism is able to move between the storage system and the brewing system and is designed in such a way as to adopt at least two positions, a first or reception position in which the capsule is held and is able to be transferred by the capture means and a second or release position in which the capture means can be opened to release the capsule from the capture mechanism. The device provides advantages in the handling of the capsule after its selection, in particular, its transfer, the brewing of its contents, and, optionally, the ejection of the spent capsule in a reliable, rapid and automated manner. In addition, the invention provides more reliable usage with no problems of pouring and draining the liquid extract.

10 Claims, 9 Drawing Sheets

DEVICE AND METHOD FOR SELECTING AND BREWING THE CONTENTS OF A CAPSULE TO PREPARE A BEVERAGE

CROSS-REFERENCE TO RELATED APPLICATIONS

This application is a continuation of International application PCT/EP02/12174 filed Oct. 30, 2002, the entire content of which is expressly incorporated herein by reference thereto.

BACKGROUND

The present invention relates to a device for preparing a drink from capsules containing a substance to be brewed in a brewing system forming part of the device. The present invention is more particularly to do with selecting and handling a capsule in such a device.

It is known practice to prepare drinks such as coffee from capsules containing a predetermined amount of ground roasted coffee. Capsules have the advantage of simplifying the operations of preparing the drink, ensuring clean preparation without leaving visible grounds, and giving precise control over the quantity and quality of the prepared product, all in a reproducible manner.

In general terms, the method of brewing the contents of a capsule consists in (i) enclosing the capsule in a pressure-resistant chamber, (ii) piercing one of the faces of the capsule, usually by means of spike(s) or blade(s) situated in a part with a water inlet also referred to as the "bath", (iii) introducing a quantity of hot water into the capsule to create an environment at a pressure of several bar inside the component to produce the liquid coffee extract, and then (iv) releasing the liquid coffee extract through the opposite face of the capsule, which, when contacted by projecting parts, opens due to the internal pressure created inside the capsule. The advantage of this method of brewing from capsules arises from the fact that the brewing conditions (particularly temperatures, pressures and times) can be controlled because both the contents and packaging of the capsules are made under precisely controlled conditions.

In most commercially available brewing devices, the capsules are loaded by hand individually into the brewing capsule holder, which usually corresponds to the base part from which the liquid extract is then poured. The capsule holder may come in a variety of forms, usually in the form of a spoon with bayonet engagement as in traditional expresso machines, or in the form of movable jaws that close under the action of a toggle mechanism. There are also capsule loading systems of the movable drawer type for transferring the capsule in a simplified loading movement—linear horizontal or other—into the brewing system. Such a system is described in European application 1 153 561. However, these systems only take a limited number of capsules inserted into the system by the user himself or herself.

There is however a need for capsules to be fed from a capsule store without the need for the capsule to be handled directly but instead encouraging a more automated placing of the capsules in the brewing system. There is also a need to provide stores for capsules of either the same or different kinds, while also being very easy to fill. Certain systems have already been described in patent publications. For example, Swiss patent application No. 471,570 relates to automatic coffee machines comprising a mechanism for heating and dispensing water, a mechanism for storing filled cartridges containing coffee powder interacting with a receiving disc and transporting the cartridges in order to place them in front of a hot-water discharge nozzle and remove the cartridges after infusion; all these mechanisms being operated by motors in a synchronized configuration. The cartridges are transported individually from hoppers on a disc with holes, to a pressurized water outlet. Such a device is rudimentary and is not designed to supply a modem brewing system in which the enclosure is completely closed around the capsule in order for brewing to take place under precisely controlled and reproducible conditions of pressure, time and temperatures. Moreover, ejecting the cartridge from the disc requires dislodging the cartridge from the disc by lifting the cartridge, which can lead to problems with jamming and recovery.

U.S. Pat. No. 6,240,832 relates to a device for supplying portions of ground coffee to a brewing unit having a magazine able to hold a plurality of portions of coffee and means for discharging individual portions into the feeder device. The capsule discharging system is relatively complex and uses several pairs of catches operated by pairs of operating components which are themselves controlled by an electromagnet. Each series or tube of portions of coffee possesses its own unloading components rendering the system relatively complex, inefficient and expensive. In addition, the system demands great precision and perfect synchronization of the movements of the discharging components, which must act at the same time to prevent the portions of coffee becoming stuck in the system. With repeated cycles and with wear of the parts, such a system may prove to be unreliable and prone to more or less serious failures. Another problem is that the brewing chamber receiving the portion must pivot sideways to line up with the direction of the brewing support, before moving upwards to meet said support in a linear movement. The repeated combination of complex movements on several axes is likely to affect the precision of the brewing system, to modify the brewing conditions in the course of time, encourage premature wear of mechanical parts and so reduce the reliability and life of the device. Another disadvantage is that the brewing occurs in an upward direction, the extracted liquid passing out at the top of the brewing support, so a tube to the cup filling point has to be provided. Such a configuration poses problems of draining the liquid.

The invention now provides seeks to overcome the disadvantages of the known devices of the prior art.

SUMMARY OF THE INVENTION

The invention provides a device for preparing drinks that incorporate a capsule selection function connected to a system for brewing the contents of the capsules to enable brewing to take place under optimal conditions. The device provides advantages in the handling of the capsule after its selection, in particular, its transfer, the brewing of its contents, and, optionally, the ejection of the spent capsule in a reliable, rapid and automated manner. In addition, the invention provides more reliable usage with no problems of pouring and draining the liquid extract.

The device comprises a storage system comprising capsules arranged in several sets, a capture means for capturing a capsule individually from a set and releasing the capsule into a brewing system. The capture means is able to move between the storage system and the brewing system and is designed, configured and dimensioned in such a way so as to adopt at least two positions, including a first or reception position in which the capsule can be held and supported by the capture means for transfer, and a second or release position in which the capture means can be opened to release the capsule from the capture means into the brewing system.

The capture means is generally opened to release the capsule into the brewing system, which is designed to close over the capsule. The capture means preferably comprises a capture mechanism that is received and remains in the brewing system without interference when the brewing system closes over the released capsule. After release, the capsule is handled by the brewing system without significant mechanical interaction with the capture means. This independence gives a brewing system that is autonomous and therefore capable of ensuring controlled and reproducible brewing conditions.

In a preferred manner, the capture means releases the capsule to the brewing system in a coordinated manner in response to the closing of the brewing system about the capsule. In this way the time required to load the capsule and close the brewing system is reduced significantly.

Additionally, means for opening the capture means are provided and act on the capture means advantageously on a first occasion to open it so as to release the capsule into the brewing system and then on a second occasion to open it so as to release the capsule into an ejection area after the capture means has recovered the used capsule from the brewing system. Hence the same means is advantageously used for both changing and ejecting the capsule from the system.

BRIEF DESCRIPTION OF THE DRAWING FIGURES

A clearer understanding of these and other possible features and their advantages will be made possible by the description which follows and by the accompanying drawings.

DETAILED DESCRIPTION OF THE PREFERRED EMBODIMENTS

Figure 1:
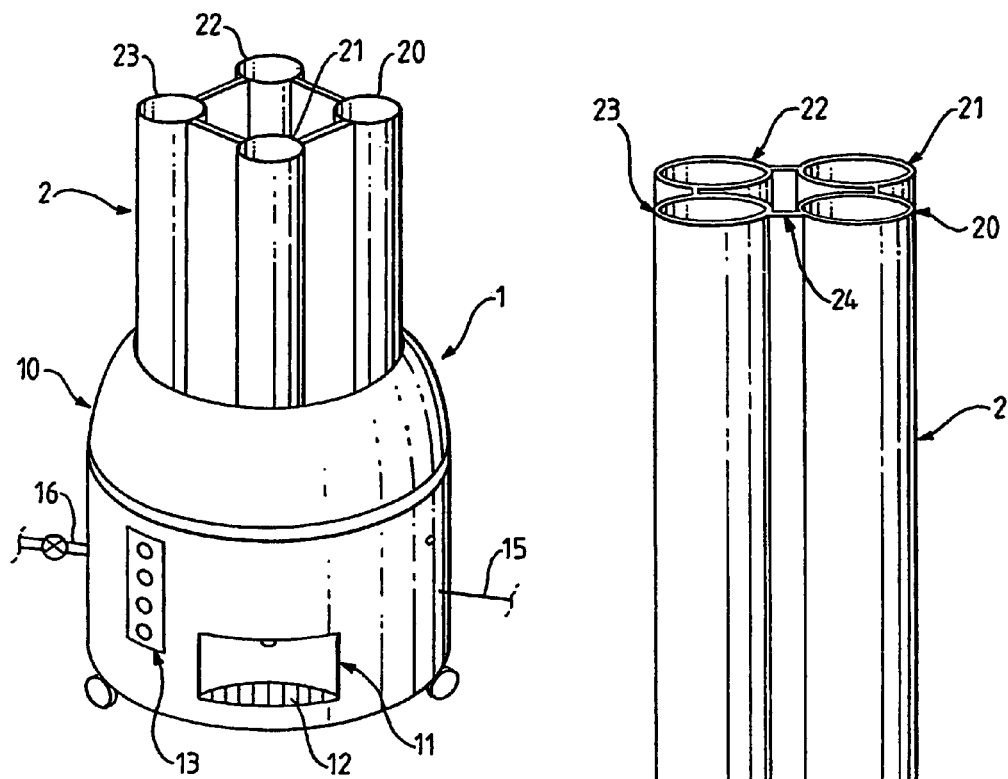
FIG. 1 is a general perspective view of a brewing device with an automatic capsule loading system according to the invention in a housed configuration.
Figure 2:
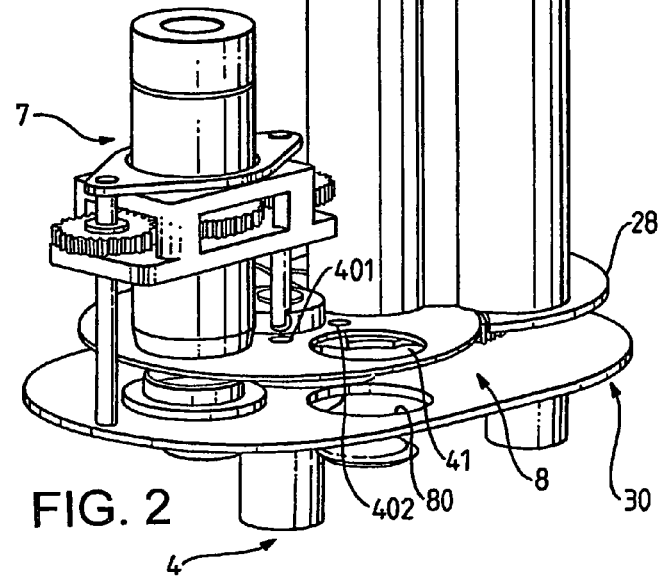
FIG. 2 is a general perspective view of one side of the same device but showing the mechanical parts of the device without the external housing and without the control part of the device.

In a preferred arrangement, the capture means comprises a pair of jaws able to move between a closed position sufficient to hold the capsule and a spread position to release the capsule. The pair of jaws is preferably openable elastically by spreading them apart by means of a nose that activates said jaws by a relative movement of said nose with respect to a spreading area of the jaws. The jaws preferably offer bearing surfaces on which the capsule can at least partly rest, to enable it to be transferred without damaging it. In a preferred embodiment, the pair of jaws is mounted so as to be rotatable so that it can move between the storage system and the brewing system.

In order to allow precise coordination between the capture means and the brewing system, the pair of jaws is able to move relative to the nose to release the capsule by the thrust of at least one thrust member moving in combination with a moving part of the brewing system when the brewing means closes around the capsule.

In a preferred configuration, the used capsule is removed after brewing by the same capture means as was used to place the capsule in the brewing system. For this purpose the jaws are openable in an ejection area after the contents of the capsule have been brewed, and after the capture means has been moved to an intermediate area between the brewing area and the loading area. The spreading apart of the jaws in the ejection area to release the used capsule is preferably effected by cam means which is operatively associated with the nose for spreading apart the jaws in the ejection area to release the used capsule by moving the nose. Such a cam means is operable cyclically according to the movement of the capture means and its position. This simplifies the control of the opening and closing of the jaws.

The invention also relates to a method of selecting and loading a capsule that includes contents for the preparation of a drink in a brewing system from a storage area comprising several sets of capsules. One aspect of this method comprises capturing a capsule individually from a set, moving the capture means between the storage area and the brewing system in to at least two positions, including a first or reception position in which the capsule can be held and supported by the capture means for transfer, and a second or release position in which the capture means can be opened to release the capsule from the capture means into the brewing system; and releasing the capsule into a brewing system for brewing of its contents.

Another aspect of the method comprises selecting and capturing one capsule from one of the sets of capsules, transferring the selected and captured capsule to a brewing system, releasing the capsule into the brewing system, closing the brewing system around the capsule, and brewing the contents of the capsule in the brewing system. The method is characterized in that the capsule is captured and then released into the brewing system, the latter being able to close around the capsule.

In one preferred embodiment, the capsule is released into the brewing system via capture means in a movement of disengagement that causes no mechanical interaction between the brewing system and the capture means. The capsule is preferably released by the capture means by deposition of the capsule onto a reception part of the brewing system resulting from a movement of vertical approach and lateral disengagement of the capture means. This gives precise positioning of the capsule in the brewing system allowing an autonomous brewing system to close around the capsule.

In another preferred embodiment, the used capsule is recovered, transferred to an ejection area, and released again. In addition, the capsule in the brewing system is coordinated with the closure of the system and, in reverse, the recovery of the used capsule from the brewing system is coordinated with the re-opening of the brewing system.

The brewing device according to the invention shown in FIG. 1 is a machine for dispensing coffee and/or other drinks for preparing drinks by brewing a food substance contained in capsules with preinserted ingredients. The device comprises a cabinet 10 of both attractive and functional shape which contains the essential elements of the brewing, selection and actuation system of the device. At the back of the cabinet is a storage system 2 with a plurality of tubes 20, 21, 22 and 23 containing sets of capsules for brewing. The front of the cabinet is a service area 11 comprising a stable support 12 for holding one or more receptacles for collecting the drink. A control panel 13 is provided at the front of the cabinet and has drink-selecting buttons corresponding to the different choices of capsules available in the storage device. Some buttons may also correspond to certain possible mixtures obtained by means of more than one selected capsule. The device is supplied with electricity by an electric power line 15 and with water by a water pipe 16.

Figure 3:
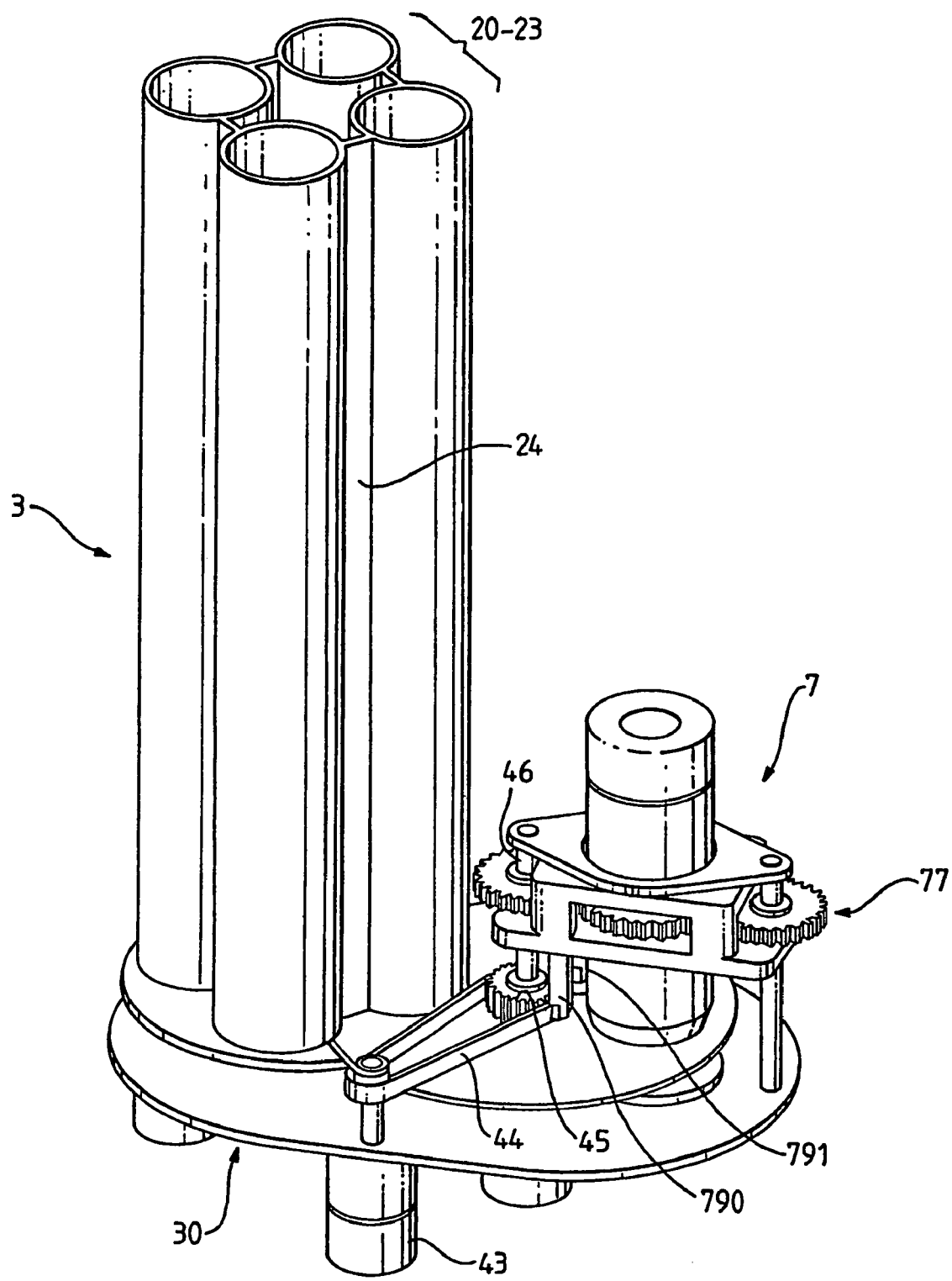
FIG. 3 is a general view similar to that of FIG. 2 but of a second side of the device.
Figure 4:
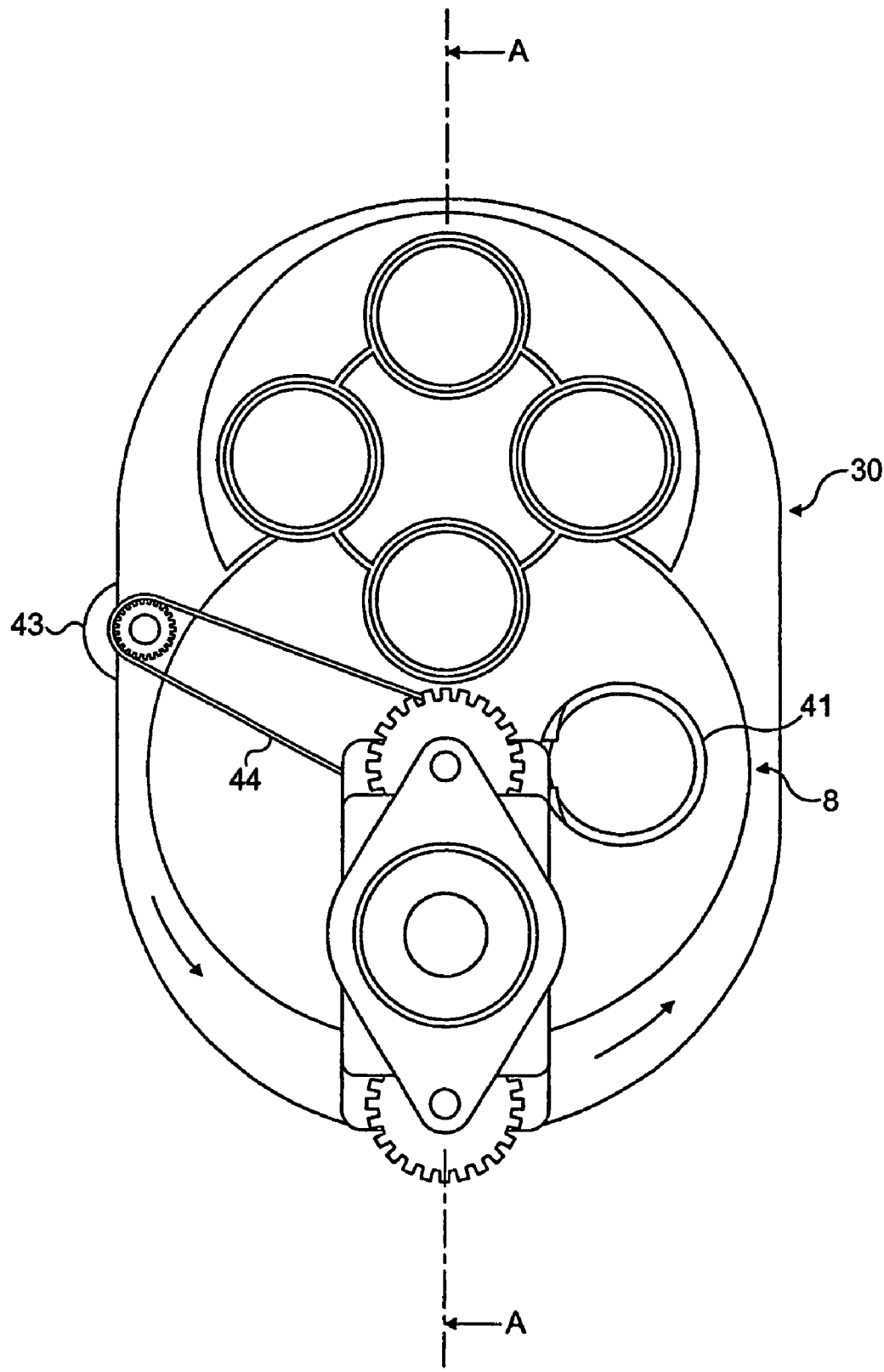
FIG. 4 is a top view of the device.
Figure 5:
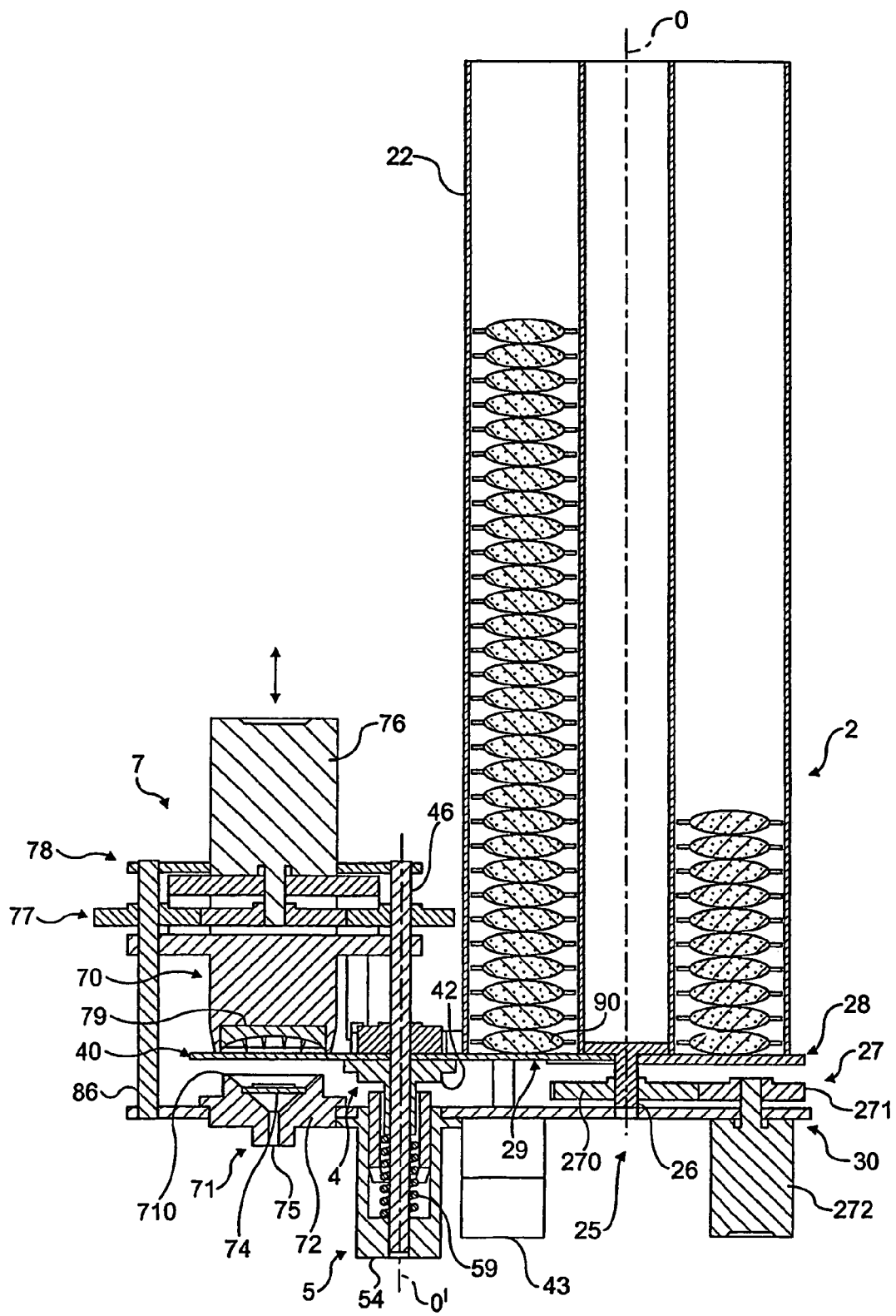
FIG. 5 is a cross section marked A-A in FIG. 4.

Referring to FIGS. 2 to 5, the device according to the invention comprises a main base 30 on which is mounted a storage system 2 in the form of a carousel comprising several refilling tubes 20-23 standing vertically and arranged together in a closed orbital arrangement. Each tube forms a vertically oriented internal space suitable for housing a set of capsules stacked freely on top of each other in the refilling tube. The refilling tubes may be connected to each other to form a relatively rigid assembly when the carousel is rotated. For this purpose each tube is connected longitudinally on either side to its neighboring tubes by connecting webs 24. As shown in FIG. 5, the refilling tubes are connected together at their lower base by a central connection means 25 which extends downwards by a central axial rod 26 connected rotationally to the base 30. Drive means 27 are used to turn the central shaft 26. These means may include, as shown in FIG. 5, meshing wheels 270, 271 and an electric motor 272, the latter being connected to the base 30. In one possible variation, the drive means may include a cam of the Geneva wheel mechanism type whose function is to produce one precise rotation per quarter of a revolution of the refilling tubes.

To make the assembly stable and keep the capsules in the tubes in the storage position, a tube supporting means 28 is provided on which the central connection means 25 rests. The tube support means 28 is a stationary supporting plate mounted on the main base 30 by spacer means (not shown). The central shaft of the carousel 26 passes in a sliding manner through the supporting plate 28 to allow the carousel, that is the assembly formed by the refilling tubes 20-23 and their connection means 25, 26, to be rotatable about a central vertical axis O relative to the supporting plate 28, which is stationary relative to the base 30. The refilling tubes 20-23 can therefore be moved about a circular path I orbiting about the axis O as shown schematically in FIG. 6. The tubes are thus able to move between a configuration in which the capsules are supported by the supporting plate 28 and a preselection configuration corresponding to a recess 29 formed in the supporting plate 28, which recess 29 intersects a given arc of the orbital path I. The recess 29 thus provides a lower opening in the supporting plate 28 for one of the set of refilling tubes— which happens to be tube 22 in the example of FIG. 6.

FIGS. 5 to 8 illustrate the capture means 4 used to capture a preselected capsule in the storage system 2. The expression "preselected capsule" means a capsule 90 at the bottom of the tube positioned over the recess 29. The capture means 4 comprises a shut-off plate 40 with an opening 41 of sufficient size for a capsule situated over it to pass freely through it. Below this plate 40 is a hinged component that can adopt at least two positions, including a retention position for retaining the capsule and a release position for releasing the capsule. Such a component is preferably a pair of jaws 42 which moves integrally with the shut-off plate about a central axis of rotation O' parallel with and offset from the axis O of the carousel. For this purpose the jaws 42 and the plate 40 are mounted on a central rod 46. The shut-off plate and the jaws are rotated by means of a drive assembly comprising a motor 43 which drives by means of a belt 44 a central pinion 45 which in turn is integral with the rod 46, as shown in FIG. 3.

Figure 6:
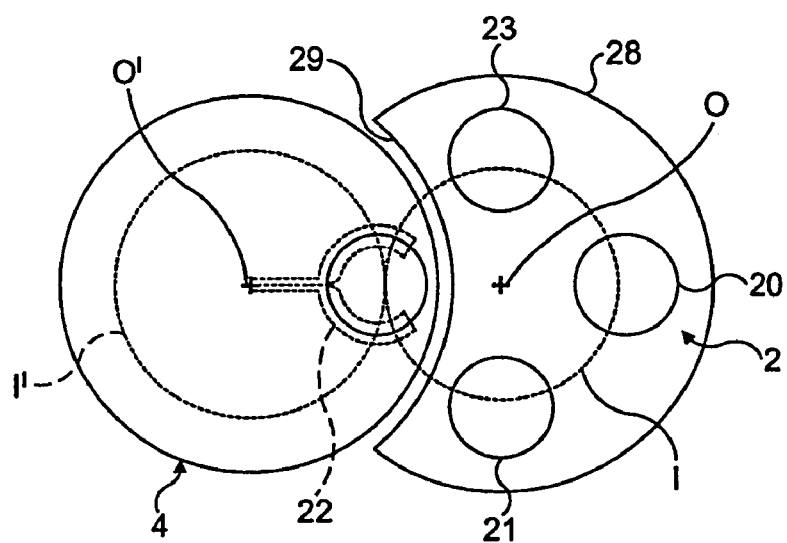
FIG. 6 shows schematically the arrangement between the capture system and the storage system of the device.
Figure 7:
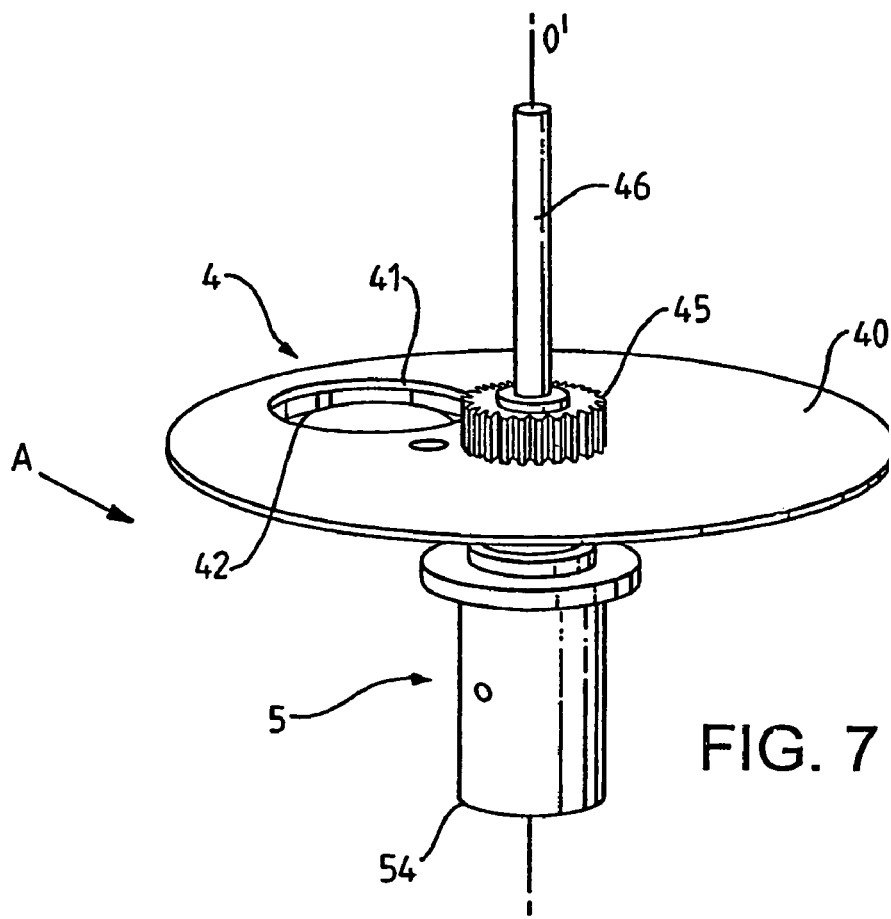
FIG. 7 is a perspective view of the capture and actuation system.

It will be understood that the capture means 4, intentionally simplified in FIG. 6, can travel around a second circular path I' which intersects the first circular path I of the storage system 2. More exactly, the essential capture components which are the opening 41 and the jaws 42 move together along the path I' in such a way that at the moment of capture they lie in the recess 29 of the tube supporting plate 28. For this purpose the shut-off plate 40 covers the recess 29, thereby holding back the stack of capsules in the tube in position in the recess 29 until the moment when its discrete opening 41 is aligned with the preselected tube, that is to say in the intersection of the orbital paths I-I'.

Figure 8:
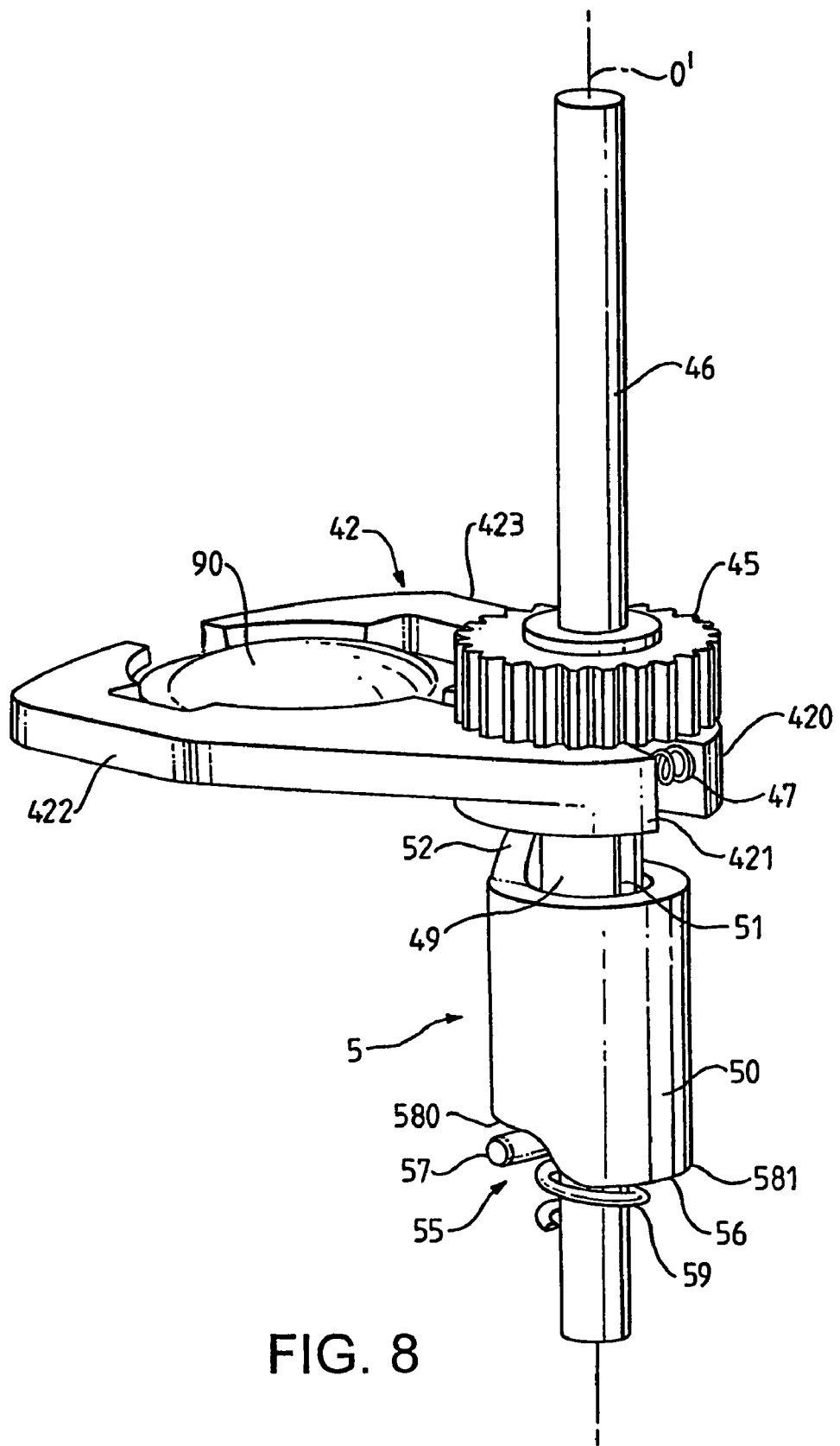
FIG. 8 is a detail from FIG. 7, without the casing.

The capture system 4 will now be described in more detail. As shown in FIG. 8, the jaws 42 of this system are held closed by a spring 47. The spring acts in compression on the opposing parts 420, 421 of the gripping members 422, 423 of the jaws in such a way as to push these members towards each other and thus offer a supporting ledge 48 for the capsule 90. Beneath the jaws 42 are actuating means 5 for opening and closing the jaws. The actuating means slide up and down inside a casing 54 mounted on the base 30 (visible in FIGS. 5 and 7). The rod 46 is itself mounted rotatably in the base of the casing at one end and extends upwards to participate in driving the brewing device as will be explained below. The jaws 42 are kept pressed against the underside of the shut-off plate 40 by a compression spring 59 housed in the casing. Due to the compression of the spring and in the absence of a reverse load pushing on the jaws, the jaws 42 remain effectively in contact with the shut-off plate 40. As will be explained below, a pushing force on the jaws 42 is then used to open the jaws under certain conditions.

Figure 9:
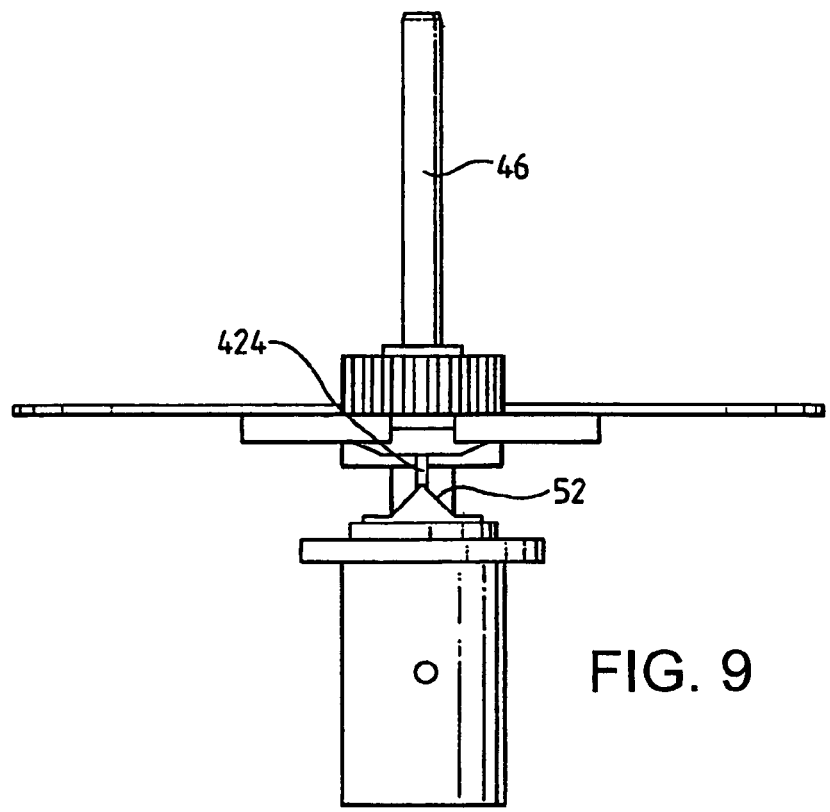
FIG. 9 is a front view of FIG. 7.

The actuating means 5 for actuating the capsule capture system comprises a tubular component or cylinder 50 guided translationally up and down a cylindrical base 49 of the jaws by a tongue-and-groove guidance means 51. The cylinder 50 is therefore able to move translationally up and down the lower base 49 of the jaws but is prevented from rotating relative to it. The top of the cylinder ends in a nose 52 which is aligned between the jaws 42 as shown in FIG. 9. The nose 52 acts on a spreading zone 424 of the jaws at the base of the jaws. At the other end of the cylinder, the cylinder engages with the casing by means of a cam mechanism 55 that enables the cylinder 50 to move up and down in a cyclical manner with each revolution of the capture means 4 about the rod 46 of axis O'. The mechanism 55 comprises a cam surface 56 formed within the tubular section of the cylinder and acted upon by a fixed radial pin 57 inside, and integral with, the casing 54. The cam surface 56 possesses a recessed part 580 as shown in FIG. 8 in which the pin 57 applies no pressure, and a relief part 581 opposite the recessed part 580 in which the pin does apply pressure. When the cylinder is turned so that the recessed part 580 is over the pin 57, the cylinder remains in the down position and its nose 52 applies no spreading force on the jaws, so they remain closed. This position corresponds to the capsule capture position of FIGS. 7 and 8 and also to the transfer position. On the other hand, when the cylinder is turned so that the relief part is in contact with the pin 57, the cylinder is pushed up by the pressure of the pin on the relief part so that the nose exerts a spreading force on the jaws. This position corresponds to the situation of ejection of a capsule after brewing as will be explained later in detail.

As shown in FIGS. 3 to 5, the device is provided with a brewing system 7 situated on the opposite side of the rotational rod 46 of axis O' of the capture means from the storage system 2. The brewing system is provided with a brewing assembly composed of a brewing head or moving block 70. The block 70 is formed of an open cavity 79, also referred to as the "bath", comprising spikes for piercing the capsule and a hot-water inlet (not shown). The brewing system 7 also possesses a stationary extraction base 71 comprising a brew dispensing member 72. This member 72, as known per se, is mounted directly on the base 30. It possesses a pressure distributing plate 74 necessary for opening the capsule and a pipe 75 through which the liquid brew flows out. The block 70 moves translationally up and down both the rod 46 and also an additional rod 86. A central motor 76 mounted on a frame 78 connected to the rods 46, 86 opens and closes the block 70 relative to the stationary brewing member 72 via a gear system 77 designed to distribute the driving forces of the motor on both sides of the rods 46, 86.

Lastly, the brewing device 7 comprises thrust members 790, 791 connected to the lower part of the moving frame 78, its purpose being to open the jaws 42 when the latter are moved with a capsule into the brewing device to release their capsule. For this purpose the thrust members 790, 791 have the structure of rods, each of which is designed to apply a force to one of the jaws as the upper brewing subassembly 70 descends to close the capsule from the top. It is to be observed that the shut-off plate 40 contains holes 401, 402 visible in FIG. 2 allowing the thrust members 790, 791 to pass through it. The thrust members 790, 791 act on the jaws in such a way as to coordinate their opening with the closing of the brewing device triggered by the descent of the moving brewing block 70. At the bearing end of each thrust member 790, 791 there is advantageously a small wheel oriented in the direction of the opening/closing movement of the jaws so that the jaw movement is not impeded.

The invention will now be described in its operation in order to explain more clearly the role of each component and the manner in which these components interact.

1. Choosing a Drink and Selecting a Corresponding Capsule:

The consumer chooses a drink by pressing one of the buttons on the control panel 13 of the main cabinet of the device (FIG. 1). The signal corresponding to the selection is sent to a central control system (not shown) of the device, which processes this signal and orders the storage system 2 to move. The identification of the tube corresponding to the selection can be processed in a variety of different ways. In a preferred embodiment, identification is by an electronic code carried on each tube which is readable by a reader within the device. The code may be a bar code, a radio frequency code ("RFID"), or any other equivalent coding means capable of holding identification information about the type of capsules contained in the tube. Another means of identification may be a system for identifying colors by means of one or more color sensors located where the tubes pass. The tubes may be transparent and may contain colored capsules which are identified by the sensors as the tube passes by. A simpler means of identification would be to initialize the tubes and then count ahead by means of a counter. The identification means may also include microswitches or electromagnets for stopping the motor.

The carousel is turned by the motor 272 controlled by the controller until the moment when the identified and selected tube arrives at the point of intersection I-I'. The controller stops the motor and the selected tube is in the preselection position. If the choice corresponds to a capsule corresponding to a tube already in the preselection position, the controller recognizes this fact and the motor 272 is not started.

2. Capturing a Capsule and Transferring it to the Brewing System:

In the next step, the capture system 4 is moved in response to a command from the controller from an ejection position, which will be detailed below, to a position in which the capsule situated inside the preselected tube is captured. For this purpose the controller starts the motor 43 which then drives the shut-off plate 40 and the jaws 42 together to the capture position. The capture position corresponds to the position in which the discrete opening 41 of the shut-off plate 40 coincides vertically with the bottom opening of the preselected tube. Once in this position, the controller stops the motor 43. The bottommost capsule 90 inside the tube falls under gravity through the opening and is caught by the contact edges 48 on the pair of jaws 42 situated beneath it. The jaw is in this case in the closed position. For this purpose the cylinder 50 is in the down position as shown in FIG. 8, the recessed part 580 of the cam surface being turned towards the fixed pin 57 inside the casing. It should be noted that the space between the jaws and the shut-off plate 40 is just sufficient for the thickness of one capsule. The other capsules situated inside the tube are thus still stacked on top of the captured capsule. The shut-off plate 40 acts as a separator after rotation between the captured capsule and the rest of the stack contained inside the tube. It would be conceivable to add an additional separator to allow the descent of the selected capsule through the shut-off plate without having to support the weight of the whole stack. This facilitates the descent and reduces the risk of blockage.

The next step is to transfer the capsule captured by the jaw to the brewing system. For this purpose the capture system 4 is rotated again by the motor 43 under the command of the controller.

Figure 10:
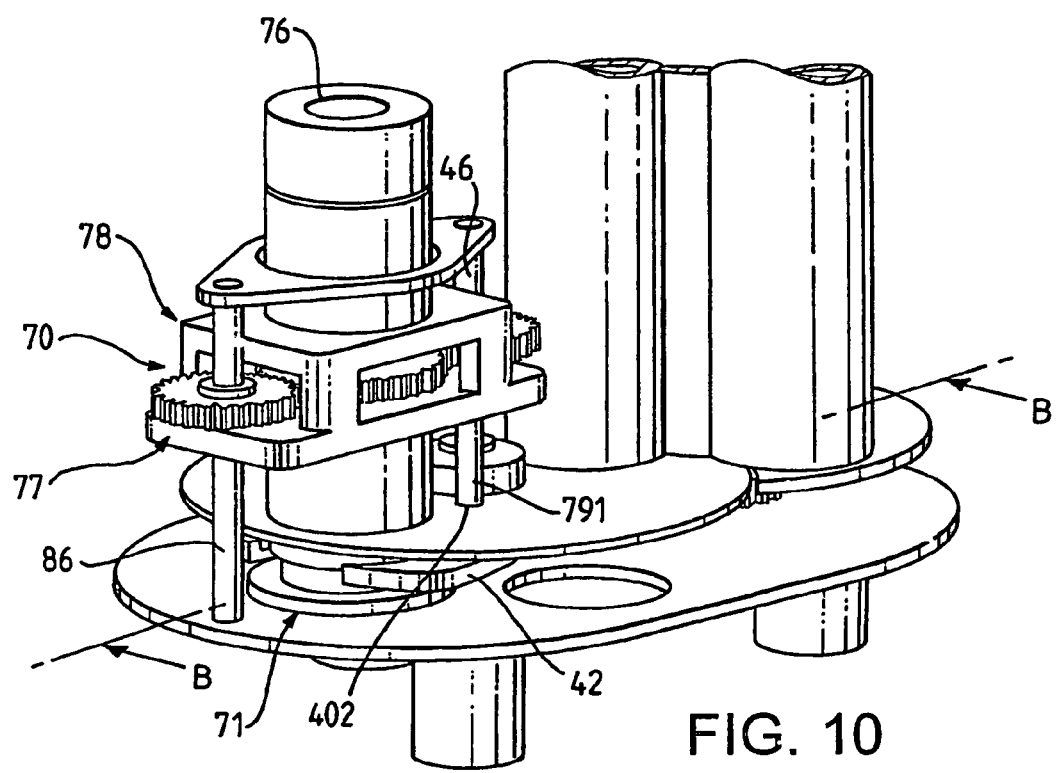
FIG. 10 is a partial perspective view of the device in a closed brewing configuration.
Figure 11:
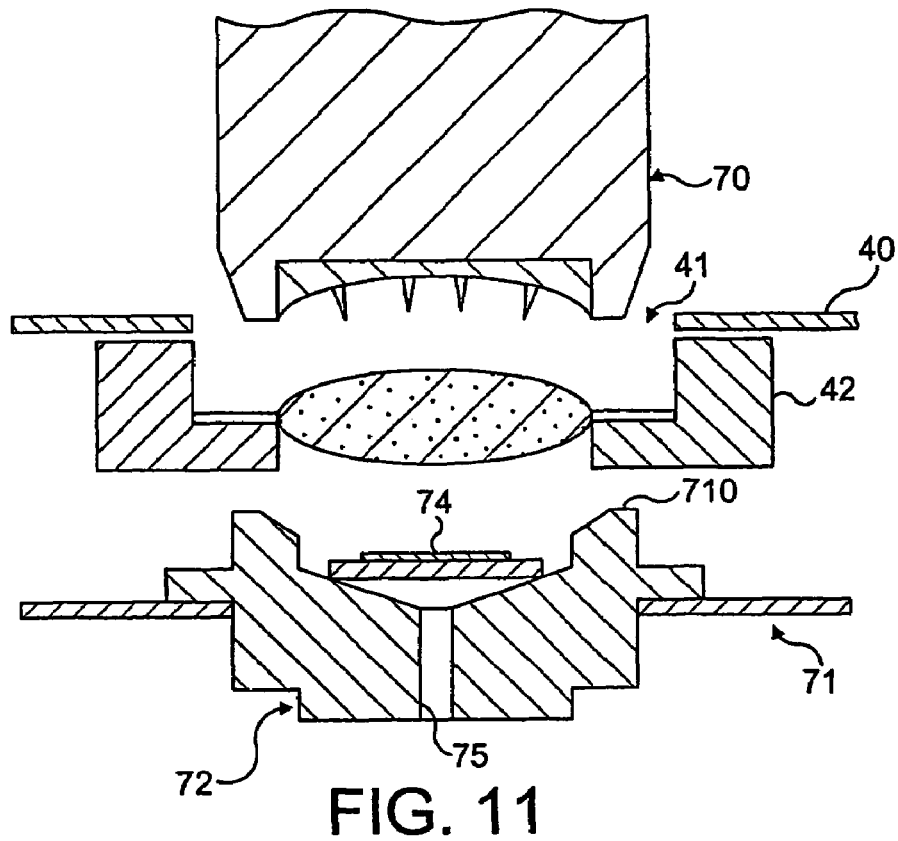
FIG. 11 is a schematic sectional view marked B-B in FIG. 10 in an open configuration of the brewing system.
Figure 12:
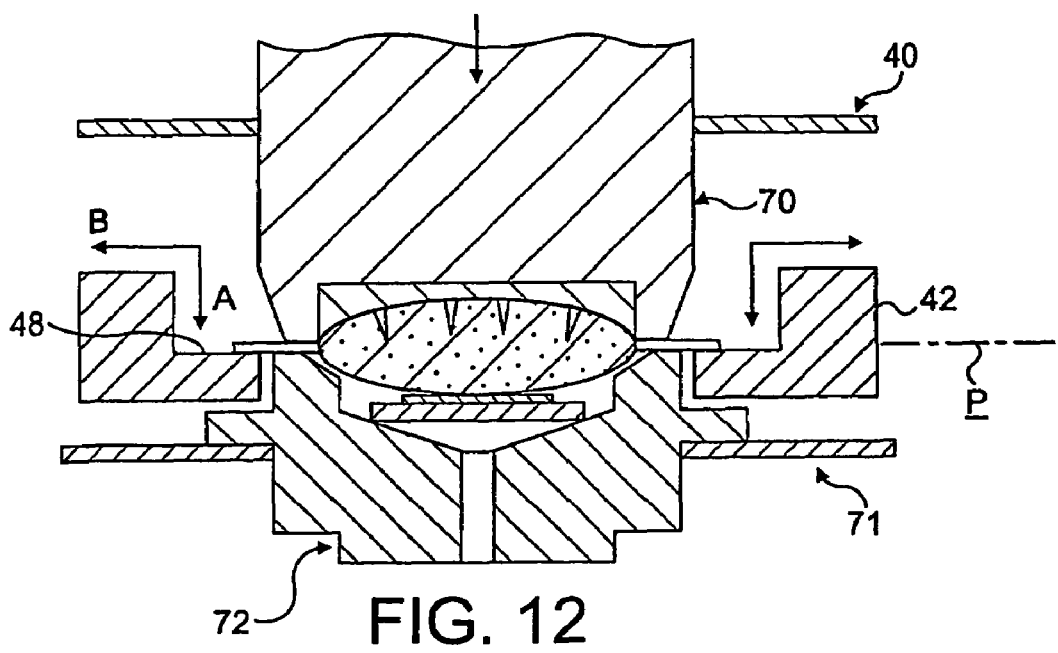
FIG. 12 is a schematic sectional view marked B-B in FIG. 10 in a closed configuration of the brewing system.

3. Releasing a Capsule Into the Brewing Device:

FIGS. 10 to 12 illustrate the step of releasing a capsule into the brewing system. The capsule is moved by the jaws 42 until it is over the stationary lower brewing block 71. The motor 43 is then stopped. The motor may be stopped by microswitches or any equivalent means familiar to those skilled in the art. The controller then causes the upper moving brewing block 70 to descend by starting the motor 76. The rotation of the motor shaft turns the gears 77 which then move the block 70 down the rods 46, 86 which are threaded for at least part of their length in order to engage with screwthreads in the bores of the side gears. The descent of the moving block 70 causes the thrust rods 790, 791 to pass through the holes 401, 402 in the shut-off plate until the jaws 42 come open.

When the jaws are thus acted upon by the bearing members 790, 791, they move down away from the supporting plate 40 and into contact with the nose 52 of the actuating means 5. The jaws are pushed down, compressing the spring 59 inside the casing. The contact of the jaws against the nose has the effect of opening them and therefore releasing the capsule into the extraction device as shown diagrammatically in FIGS. 11 and 12. The release occurs as the jaws 42 move vertically towards the bearing surfaces 710 of the fixed lower brewing block 71. The jaws 42 therefore move both down A and apart B enabling them to disengage from the brewing block as shown in FIG. 12. The closure of the brewing system by the block 70 thus occurs simultaneously with the movement of the jaws.

It should be observed that the dimensions of the moving block 70 allow it to pass through the opening 41 in the shut-off plate without difficulty. It should also be observed that the jaws 42 are pushed in the direction A until their contact surface 48 is below the contact plane P of the capsule corresponding to the reception surface 710 of the lower block. The jaws are now in the waiting position until brewing is completed.

The capsule is now gripped between the upper moving block 70 and the lower stationary block 71. The capsule preferably has lateral edges which are gripped at the interface between the two brewing blocks. The capsule is therefore taken over entirely by the brewing system without significant mechanical interaction between the capsule and the capture means at this stage. The brewing system can be made completely leaktight by a sealing means such as O-rings or the like (not shown).

The brewing process is then controlled by the controller.

4. Brewing the Contents of the Capsule:

The process of brewing the contents of the capsule is known per se. There is no need to describe the principle in detail. A detailed description of the brewing principle will be found in U.S. Pat. Nos. 5,826,492, 5,649,472 and 5,762,987, as preferred examples. The teaching of these patents is introduced in relation to the manner of brewing in the present application to the extent necessary by reference thereto.

5. Recapturing the Capsule from the Brewing System, and Transferring and Ejecting It:

Once the brewing procedure is over, the used capsule is recovered by the jaws 42 due to the opening of the moving brewing block 70. The controller starts the motor in the opposite direction of rotation of the gears 77, causing the moving block 70 to move upwards. In the reverse of the closing process, the movement of the block 70 carries the thrust rods 790, 791 upwards, removing the pressure from the jaws. The jaws move back into position underneath the shut-off plate due to the elastic relaxation of the compression spring 59 acting on the jaws. The upward movement of the jaws in the opposite direction to direction A, combined with their closing movement in the opposite direction to direction B, as in FIG. 12, picks up the edges of the capsule, captures it and lifts it off the lower brewing block 71.

Figure 13:
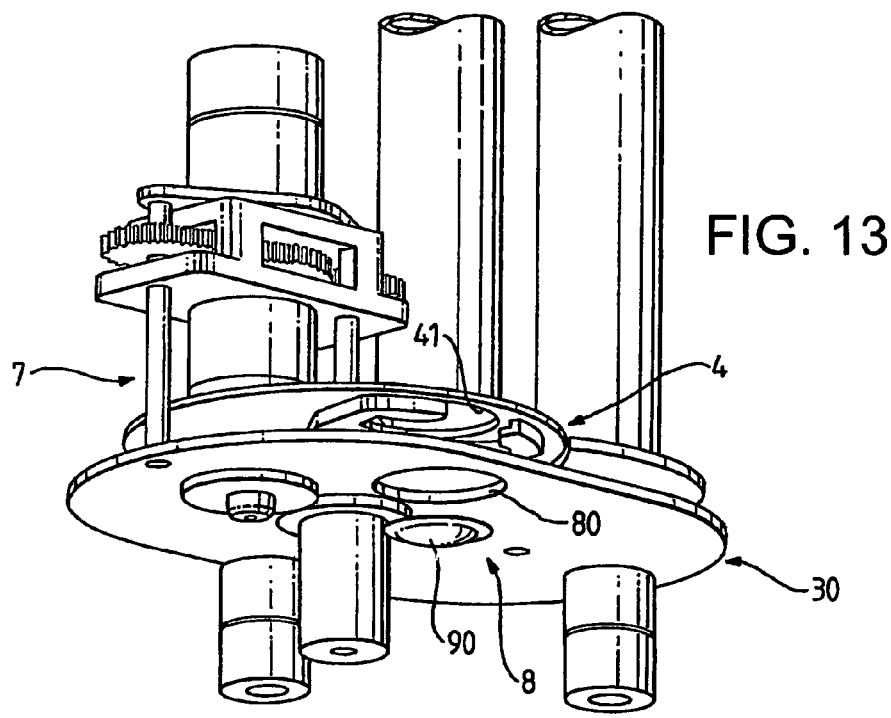
FIG. 13 is a perspective view of the device in a capsule-ejecting configuration.
Figures 14, 15:
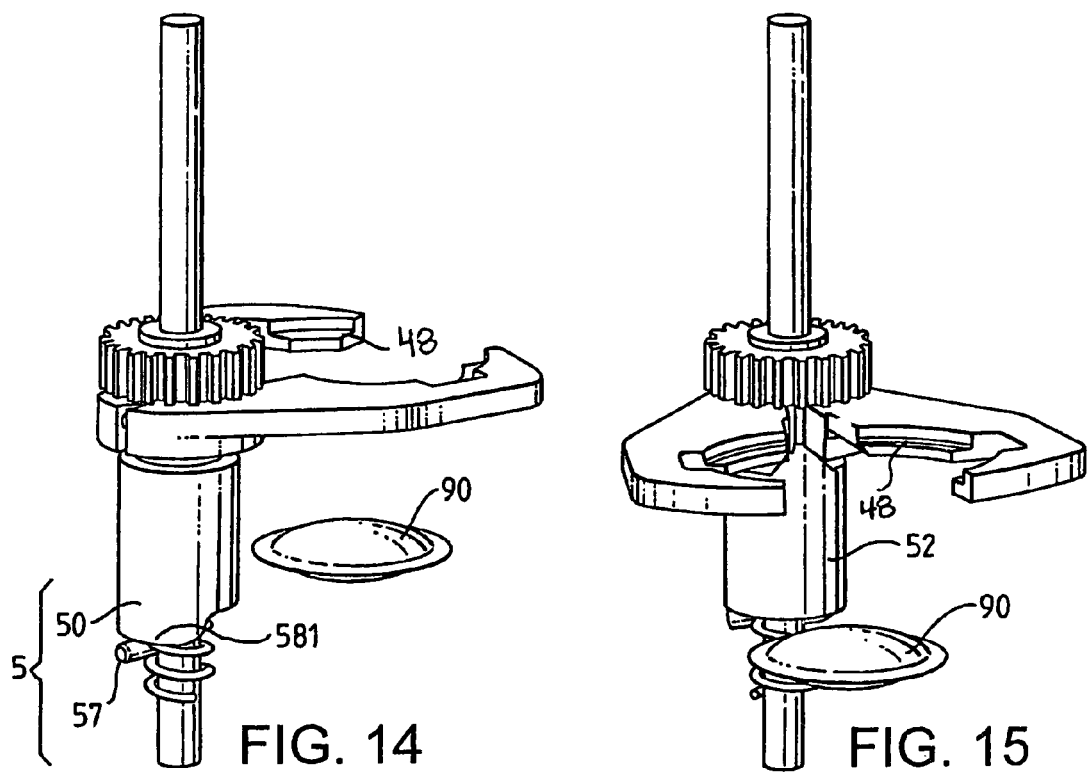
FIG. 14 is a partial detail view in perspective of the capture system.
FIG. 15 is a view similar to FIG. 14 but from a different perspective angle.

The next step is to transfer the used capsule to an ejection area. The ejection of the capsule is illustrated in FIGS. 13 to 15. For this purpose the controller starts the motor 43, which rotates the capture system 4 away from the brewing area 7 towards the ejection area 8 of the system. When the opening 41 of the shut-off plate is vertically over this area, indicated in the example illustrated by an opening 80 in the main frame 30, the motor 43 stops. In the transfer towards this zone, the rotation about the axis O' leads the cylinder 50 to rise due to the contact created between the stationary pin 57 and the relief portion 581 of the cam surface as shown in FIG. 14. As it rises, the nose 52 of the cylinder pushes the jaws apart, dropping the capsule 20. A collecting box can advantageously be placed in the device below the ejection area. The capsule is thus removed after its contents have been brewed without it being necessary to extract it from the brewing system either manually or by an ejection system built into the brewing system. In this configuration the capture system is ready to be used in a new selection cycle.

The invention described above in relation to a preferred embodiment can encompass numerous variants and modifications within the reach of those skilled in the art, without thereby departing from the scope of the claims which follow.

What is claimed is:

1. A device for preparing drinks from capsules that contain a substance to be brewed in a brewing system, the device comprising:

a storage system comprising a plurality of tubes containing sets of capsules; and a capture means for catching a capsule individually deposited from the storage system and releasing the capsule into a brewing system;

wherein the capture means is able to rotate between the storage system and the brewing system and can adopt at least two positions, including a first or reception position in which the capsule can be held and supported by the capture means for transfer, and a second or release position in which the capture means can be opened to release the capsule from the capture means into the brewing system, which is designed to close over the capsule;

wherein the capture means releases and deposits the capsule on a reception part of the brewing system resulting from a movement of vertical approach of the capture means toward the reception part and lateral retraction of the capture means away from the reception part.

2. The device as claimed in claim 1, wherein the opening of the capture means releases the capsule into the brewing system, and the brewing system is designed to close over the capsule after it is released from the capture means.

3. The device as claimed in claim 2, wherein the capture means comprises a capture mechanism that is received and remains in the brewing system without interference when the brewing system closes over the released capsule.

4. The device as claimed in claim 2, wherein the capture means releases the capsule to the brewing system in a coordinated manner in response to the closing of the brewing system about the capsule.

5. The device as claimed in claim 1, which further comprises means for opening the capture means that act on the capture means on a first occasion to open it so as to release the capsule into the brewing system and then on a second occasion to further open the capture means to release the capsule into an ejection area of the brewing system after the capture means has recovered the used capsule after the capsule contents have been brewed.

6. The device as claimed in claim 1, wherein the capture means comprises a pair of jaws that is able to move between a closed position sufficient to hold the capsule and a spread position to release the capsule, the pair of jaws being openable elastically by spreading them apart by means of a nose that activates the jaws by relative movement of the nose with respect to a spreading area of the jaws.

7. The device as claimed in claim 6, wherein the pair of jaws is able to move relative to the nose to release the capsule by the thrust of at least one thrust member moving in combination with a moving part of the brewing system when the brewing means closes around the capsule.

8. The device as claimed in claim 6, wherein the jaws are openable in an ejection area after the contents of the capsule have been brewed, corresponding to a movement of the capture means intermediate between the brewing of the capsule in the brewing area and the capture of the capsule in the loading area.

9. The device as claimed in claim 6, which further comprises cam means operatively associated with the nose for spreading apart the jaws in the ejection area to release the used capsule.

10. The device as claimed in claim 1, wherein the storage system is movable about a first path (I) and the capture means is movable about a second path (I') that intersects the first path (I) in such a way as to allow the capture of one capsule from the set located at the point of intersection of the two paths (I, I').

* * * * *